US009600142B2

(12) United States Patent
Assadollahi

(10) Patent No.: US 9,600,142 B2
(45) Date of Patent: Mar. 21, 2017

(54) DISTANCE DEPENDENT SELECTION OF INFORMATION ENTITIES

(75) Inventor: Ramin O. Assadollahi, Munich (DE)

(73) Assignee: EXB Asset Management GmbH, Munich (DE)

(*) Notice: Subject to any disclaimer, the term of this patent is extended or adjusted under 35 U.S.C. 154(b) by 1174 days.

(21) Appl. No.: 13/123,153

(22) PCT Filed: Oct. 7, 2009

(86) PCT No.: PCT/EP2009/007197
§ 371 (c)(1),
(2), (4) Date: Apr. 7, 2011

(87) PCT Pub. No.: WO2010/040517
PCT Pub. Date: Apr. 15, 2010

(65) Prior Publication Data
US 2011/0197152 A1 Aug. 11, 2011

(30) Foreign Application Priority Data
Oct. 8, 2008 (EP) .................. 08166156

(51) Int. Cl.
*G06F 3/0486* (2013.01)
*G06F 3/0482* (2013.01)
*G06F 17/30* (2006.01)

(52) U.S. Cl.
CPC .......... *G06F 3/0482* (2013.01); *G06F 3/0486* (2013.01); *G06F 17/30997* (2013.01)

(58) Field of Classification Search
CPC ............ G06F 3/04815; G06F 3/04845; G06F 3/04883; G06F 3/04886; G06T 15/00; G06T 17/00; G06T 19/00

USPC .............. 715/837, 839, 856, 862, 863, 833; 345/419, 420
See application file for complete search history.

(56) References Cited

U.S. PATENT DOCUMENTS 5,486,822 A * 1/1996 Tenmoku ............. G09B 29/106
340/990
5,757,358 A 5/1998 Osga
5,777,616 A 7/1998 Bates
(Continued)

OTHER PUBLICATIONS

Japanese Patent Office, Notice of Reasons for Rejection issued in connection with Japanese Application No. 2011-530413, mailed date Nov. 13, 2012, 10 pages. (with English Translation).
(Continued)

Primary Examiner — Jeffrey A Gaffin
Assistant Examiner — Rinna Yi
(74) Attorney, Agent, or Firm — Hanley, Flight & Zimmerman, LLC

(57) ABSTRACT

The invention relates to the field of man-machine interfacing. In particular, it relates to a user interface allowing a unified approach for organizing and navigating data on a computing device. A method executed on a processor for displaying on a screen a set of entities associated with at least one of at least two particular entities, comprises the steps of: displaying on the screen indicia of the at least two particular entities; determining the distance on the screen between the displayed indicia of the at least two particular entities; determining the set of entities based on the distance on the screen between the indicia of the at least two particular entities; and displaying on the screen indicia for the set of entities.

16 Claims, 4 Drawing Sheets

(56) References Cited

U.S. PATENT DOCUMENTS

| | | | |
|---|---|---|---|
| 5,808,601 A | 9/1998 | Leah | |
| 6,029,172 A * | 2/2000 | Jorna et al. | |
| 6,157,379 A * | 12/2000 | Singh | G06F 3/04886 345/173 |
| 6,968,511 B1 * | 11/2005 | Robertson | G06F 3/048 715/205 |
| 7,268,791 B1 | 9/2007 | Jannink | |
| 7,278,115 B1 * | 10/2007 | Conway et al. | 715/838 |
| 8,095,476 B2 * | 1/2012 | Bierner et al. | 705/500 |
| 2004/0193369 A1 * | 9/2004 | Kokojima | G01C 21/3638 701/436 |
| 2005/0071761 A1 | 3/2005 | Kontio | |
| 2006/0265208 A1 * | 11/2006 | Assadollahi | 704/9 |
| 2010/0011304 A1 * | 1/2010 | van Os | 715/762 |

OTHER PUBLICATIONS

Japanese Patent Office, Notification of Reason(s) for Refusal issued in connection with Japanese Application No. JPA2011-530413, dated Aug. 13, 2013, 6 pages. (with English Translation).

State Intellectual Property Office of China, Office action issued in connection with Chinese Application No. 200980140054.5, dated Dec. 5, 2012, 5 pages.

Korean Intellectual Property Office, Notice of Grounds for Rejection issued in connection with Korean Application No. 10-2011-7009158, dated Oct. 18, 2012, 8 pages. (with English Translation).

Korean Intellectual Property Office, Office action issued in connection with Korean Application No. 10-2011-7009158, dated Apr. 26, 2013, 3 pages.

State Intellectual Property Office of China, Office action issued in connection with Chinese Application No. 200980140054.5, dated Jan. 14, 2014, 7 pages.

International Bureau, International Preliminary Report on Patentability, mailed on Apr. 21, 2011, 6 pages.

International Searching Authority, International Search Report and Written Opinion issued in PCT/EP2009/007197, mailed on Jan. 19, 2010, 10 pages.

State Intellectual Property Office of China, Office action issued in connection with Chinese Application No. 200980140054.5, dated Jun. 27, 2014, Chinese language document (3 pages), redacted English language summary of rejections (2 pages).

* cited by examiner

DISTANCE DEPENDENT SELECTION OF INFORMATION ENTITIES

The invention relates to the field of man-machine interfacing. In particular, it relates to a user interface allowing a unified approach for organizing and navigating data on a computing device, such as a work station, a desktop computer, a tablet PC, a laptop computer and/or a mobile device.

Retrieving information and navigating through information on a computer or a mobile device can be cumbersome. Not only has a user to learn the specifics of the interface of a certain application, i.e. the user interface concept, the window layout and the menu structure, but he also has to learn where within the application the intended information is stored, i.e. the organization of the information within the application and the data model. From a usability aspect the situation becomes even more complicated when the type of information which is manipulated is taken into account. By way of example, there are applications for organizing pictures, applications for organizing contacts, applications for organizing music and many other applications for manipulating many other types of information entities. This means that the user has to learn and get accustomed to all of these user interfaces and their respective data models.

Especially for consumer computers and mobile devices, it is clearly desirable to have one unified approach for organizing and navigating data in order to enhance the ease of use and to drive down the "mental costs" for a user to learn how to use the different applications on a system.

According to an aspect of the invention, a method is described which is executed on a processor of a computing device for displaying on a screen a set of entities associated with at least one of at least two particular entities. Preferably, the method is executed on a computer system, such as a workstation, a desktop computer, a laptop or a tablet PC, or a handheld or wireless device, such as a mobile phone or a PDA. The method may be implemented as a user interface of the operating system of such a device. Preferably the screen is a touch-screen, such that a user may interact with the computing device using his finger or a pen. Other means of interaction may also comprise audio cornmands.

The method may be used for displaying a set of entities associated with at least two particular entities, as well as for displaying the at least two particular entities. Such entities may be Contacts from a Contact Database; Places, such as cities or special places of interest, from a geographical database; Time instances from a Calendar application; Things, such as document files, picture files, music files and video files, from a File storage application, Web sites from a Web browser application or Emails from an Email application. In more general terms, the entities, which will also be referred to as informational entities or items, may be data units comprising a name tag for identification purposes and a plurality of content elements comprising additional information or attributes of the data unit. By way of example, an entity may be the Contact data unit in a Contact databank having a name tag which corresponds to the name of a person and a plurality of content elements or attributes such as the person's address, telephone number, Email address, etc.

It should be noted that typically the entities are represented on the screen by corresponding or related indicia. By way of example, a Contact entity could be represented by an indicia indicating the name tag of the entity, as well as an indication that the entity is a Contact data unit, or an Email could be represented by the image of a letter and an excerpt of the subject field of the particular Email message.

The method comprises the step of determining the distance on the screen between the indicia of the at least two particular entities. By way of example, the at least two particular entities may be a Contact entity and an Email entity which are represented on the screen by their respective indicia. The distance on the screen between these two indicia could be preferably measured as the physical or geographical distance between both indicia. This could e.g. be the number of pixels or the number of centimeters between both indicia. The distance could also be determined based on the coordinates of both indicia on a two dimensional screen.

In further steps, the method may determine the set of entities based on the distance on the screen between the indicia of the at least two particular entities and displays the set of entities on the screen. In other words, the set of entities that is displayed on the screen is associated with at least one of the at least two particular entities and somehow depends on the distance between the indicia of the at least two particular entities. By way of example, the at least two particular entities are a Contact entity and an Email entity. If the indicia of both entities are spacially relatively close to one another, then the set of entities may be a list of Email messages that have been received or that have been sent to the person corresponding to the particular Contact entity. If, however, the two particular entities are relatively far apart from each other, then the set of entities may be a list of most recent Email messages, regardless the sender or the recipient of the Email message.

It should be noted that the complete set of entities associated with at least one of the particular entities may comprise a large number of entities. By way of example, a complete Contact database may comprise hundreds of Contact data units. On the other hand, the set of displayed entities may be restricted due to the limited screen size. The selection of the set of displayed entities from the complete set of entities may be based on different criteria. For example scores are determined for each entity and the selection of entities for display is based on their scores, e.g. by selecting the entities having the highest scores. The scores may reflect criteria such as alphabetical order of the name tags of the entities, most recently used entities or most frequently used entities. The selection may, however, also be random. Furthermore, it should be noted that the selection of the displayed set of entities may also depend on the distance between the indicia of the at least two particular entities. By way of example, for a particular Email entity the most recently received Email messages may be displayed as a set of entities on the screen. If, however, another particular Contact entity is placed in the vicinity of the particular Email entity, then the selection may be changed to the list of most recently received Email messages from the person corresponding to the Contact entity.

According to another aspect of the invention, the method may comprise the further step of determining a representation of the set of entities based on the distance on the screen between the indicia of the at least two particular entities and the step of displaying the set of entities using the determined representation.

The representation of the set of entities may comprise the graphical display of the set of entities, e.g. the font size of the displayed set of entities, the indicia used to display the set of entities or the colors used for display. The representation may also comprise the order in which the entities of the set of entities are displayed.

According to a further aspect of the invention, the dependence on the distance only applies if the distance is below a pre-defined threshold. Each indicia of a particular entity may have an assigned threshold value defining a circle around the respective indicia. In more general terms, each indicia may have an assigned threshold area surrounding it. The joint influence that both particular entities may have on a set of entities may only occur if the threshold areas of both particular entities overlap. Otherwise, there may be no joint influence on a displayed set of entities.

According to another aspect of the invention, the method may comprise the further steps of selecting an entity of the at least two particular entities as an activated entity and of selecting an entity of the at least two particular entities as an influencing entity. The activated entity may be an entity that a user has clicked on, in order to display a certain list of associated entities. By way of example, an activated entity may be a Contact list entity, i.e. an entity representing a complete database of contact entities, which has been clicked, in order to display a set of most often used Contact entities. On the other hand, the influencing entity may be an Email list entity, i.e. an entity representing a complete database of Email messages.

It should be understood that the term "activated" may refer to both, the activation of the indicia associated with an informational entity, and/or the activation of the informational entity itself. As a matter of fact, both activation activities may be linked. Typically, the activation occurs by selecting or clicking of an indicia displayed on the screen. Activation may also be by touching an indicia on the screen with the user's finger. Activation may stay as long as the indicia is touched, or toggled on/off by individual clicks or touching. The activated indicia often has a different appearance than the non-activated indicia, in order to make a user aware that the indicia and usually also the associated entity is activated. Consequently, in the present document the term "activated entity" may also comprise the activation of the associated indicia and it may be tantamount to the term "activated indicia". Please note that this applies in a similar manner to the terms "influencing entity" and "influencing indicia".

The method may further associate a first set of entities with the activated entity and a second set of entities with the influencing entity. In the above example, a first set of entities of the Contact list entity could be the list of most frequently used Contact entities. On the other hand, the second list of entities could be the set most recently received and sent Email messages. The method then determines the set of entities to be displayed and/or its representation based on the first and the second set of entities. Following the example, the set of most frequently used Contact entities may actually be affected by the list of most recent Email messages. In one embodiment the displayed set of entities could be the list of Contact entities that appeared in the "To" and "From" fields of the most recent Email messages.

It should be noted that in a preferred embodiment the displayed set of associated entities is based on the first set of entities, i.e. it comprises the same type of entities as the first set of entities. The second set of entities, however, has an influence on the entities that are selected for the displayed set of associated entities. Furthermore, the second set of entities has an influence on the representation of the displayed set of entities, e.g. the graphical display, the ordering of the entities or the list type used for display.

According to an aspect of the invention, the entities of the first set of entities may have associated first scores and the entities of the second set of entities have associated second scores. This is particularly useful if both particular entities, i.e. both, the activated entity and the influencing entity, as well as their associated sets of entities, are of the same type of data units. By way of example, both particular entities may be Contact entities and the associated scores may be the frequency of selection by a user of that particular Contact entity. If the entities have scores stored with them, then the set of entities to be displayed and/or its representation may be determined based on the first and second scores of the first and second set of entities. By way of example, if the first and second sets of entities comprise partially the same entities, then the set of entities to be displayed may be selected as the entities from the union of the first and second set of entities having the highest joint scores.

In a further embodiment the method may comprise of the further step of calculating scores of the set of entities based on the first and second scores of the first and second set of entities. The set of entities may then be ordered according to the calculated scores and a pre-defined number of entities having the highest calculated scores may be selected to be displayed as the set of entities.

As already mentioned the displayed set of entities may be represented on the screen in multiple ways. It may e.g. be displayed as an ordered list, which is ordered by frequency of use, alphabetically, or using a time-wise ordering. The ordered list may be represented as a horizontal or a vertical list on the screen. Alternative representations may comprise circular lists, wherein the ordering is displayed clockwise or counter clockwise.

It should also be noted that one activated entity and its associated set of entities may be influenced or affected by a plurality of influencing entities whose indicia are placed nearby or in the vicinity of the indicia of the activated entity. The method would be similarly applicable, wherein a plurality of influencing entities would be selected from the at least two particular entities and wherein a second list of entities would be associated with each of the plurality of influencing entities. The determining step of the displayed set of entities and/or its representation would then be based on the plurality of second sets of entities. By way of example, if the activated entity is an Email list entity and the indicia of two Contact entities, each representing a certain person, would be placed nearby the indicia of the Email list entity, then the displayed set of entities may be the list of most recently exchanged Email messages with either one of the persons represented by the two Contact entities.

According to another aspect of the invention, the method may also allow the swapping of activated entities and of influencing entities. In general terms, the methods may comprise the further steps of selecting another one of the at least two particular entities as the activated entity and of automatically degrading the former activated entity to an influencing entity. By way of example, an activated Email list entity may be affected by an influencing Contact entity. In association with the activated Email list entity, the most recent Email messages exchanged with the person represented by the Contact entity would be displayed as the set of associated entities. By clicking on the indicia of the influencing Contact entity, this Contact entity could be activated and a set of entities associated with the Contact entity could be displayed. This set of entities would now be influenced by the Email list entity, which would now be an influencing entity for the activated Contact entity. By way of example, the set of entities associated with the Contact entity and influenced by the Email list entity could be a list of contacts used in the Email messages related to the person represented by the Contact entity.

It should also be noted that a plurality of activated entities may be selected from the at least two particular entities by either clicking the associated indicia (toggling activation on/off) or touching the associated indicia. This plurality of activated entities may be placed on the screen of the computing device, such that the respective distance on the screen between the indicia of the plurality of activated entities is larger than a pre-defined threshold value, such that none of the activated entities is an influencing entity for another one of the activated entities. In other words, a plurality of activated entities may be placed on the screen, such that they do not influence each other. By moving influencing entities in their respective vicinity, it may then be possible to create the desired interactions or associations between the influencing entities and a particular activated entity and to retrieve a desired set of associated entities.

According to a further aspect of the invention, the method may comprise the further step of setting a time limit. If the time limit has been exceeded and no entity of the displayed set of entities has been selected, search means facilitating the search for a different set of entities are displayed. This feature may be beneficial, if the association of entities does not provide the desired results. The user may then be presented with search means, such as alphabetic lists which allow the selection of the first letter of the name tag of a desired data unit.

The invention also comprises a system for displaying a set of entities associated with at least one of at least two particular entities. Such a system comprises a screen for displaying the set of entities and the at least two particular entities, processing means for determining the distance on the screen between indicia of the at least two particular entities and processing means for determining the set of entities based on the distance on the screen between the indicia of the at least two particular entities.

The objects and features of the invention will become apparent from the following description of preferred embodiments. The present invention is described in the following by referring to exemplary embodiments illustrated schematically in the accompanying figures, wherein FIG. 1 illustrates an indicia displayed on a computing device;

According to an aspect of the present invention, data is organized in a way that reduces the complexity of data structures and the navigation through the data, while departing from the conventional concepts of file explorers, contacts databases and music players. The organization and navigation is therefore holistic and not constrained to one specific form of data, such as pictures, music, emails or contacts.

It is, however, useful to illustrate the organization and navigation principle of the invention on the basis of a set of exemplary use cases or scenarios. In the following, the invention is described in the context of a contacts or address book scenario. In particular, it is described, how a user would access a contact list that is organized according to the principles of the present invention.

In one embodiment, a contact indicia or icon is presented to a user. In the following FIGS. 1 to 5 such a contact indicia is represented as reference signs 100, 200, 300, 400, 500, respectively. The contact indicia could be presented to the user on a computer screen, a touch screen, a head-up display, a mobile phone screen and the like. As mentioned before, the example illustrated in FIGS. 1 to 5 is only an example for contact folders and their specific data but should not be understood as a limitation to the general concept and the resulting method and system of the invention. In general terms, the contact indicia should therefore be understood as an indicia associated with any kind of informational entity.

Figure 2:
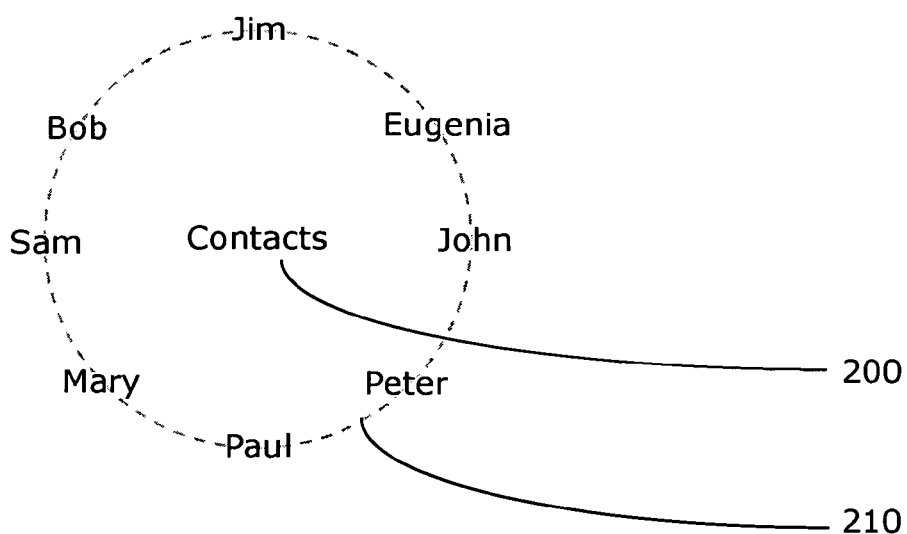
FIG. 2 illustrates a set of further information entities associated with the indicia of FIG. 1.
Figure 3:
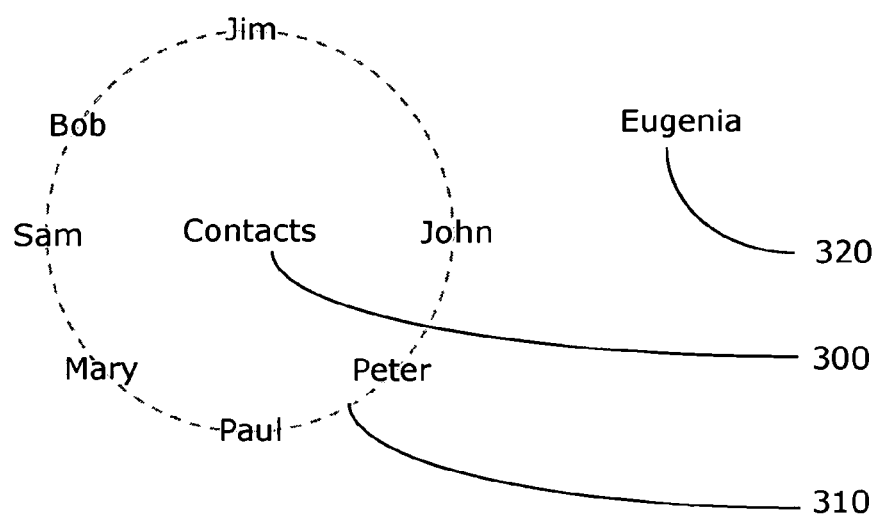
FIG. 3 illustrates the selection of an influencing information entity.

As shown in FIG. 2, if the user activates the informational entity 200, e.g. by pressing a mouse button, or by touching the information entity 200 with a pen on a touch screen, the top N, i.e. eight in FIG. 2, associated informational entities 210 are shown. The activated informational entity 200 is also referred to as the activated entity. In the present example, this set of associated informational entities 210 may be the set of contacts that the user works with most frequently. It should be noted that the number of associated informational entities displayed to the user may vary. Furthermore, the representation and the ordering of the associated informational entities may follow a plurality of design rules. By way of example, the set of associated informational entities may be presented in a vertical or horizontal list or it may—as shown by the dotted line in FIG. 2—be presented in a ring, on which the associated informational entities are presented in a clockwise order. In the following, the term "lists" is to be understood to comprise all these types of representations. Furthermore, the representation of the set of informational entities may depend on their frequency of use, such that e.g. the one o'clock position on the ring indicates the most frequent entity, while the eleven o'clock position indicates the eighth most frequent entity. Clearly such sorting or ordering may be provided for all types of lists. In general, such lists will be referred to as ordered lists.

Furthermore, it should be noted that it is to be differentiated between the complete set of associated items or entities and the displayed set or list of associated entities. In general terms, the complete set of associated entities may comprise a set of M, while only a subset of N associated entities is displayed on the device screen, i.e. M typically is greater or equal to N.

In a next step, the user may select and extract one of the associated informational entities from the displayed list, e.g. in order to work with a particular selected entity. In the present example shown in FIG. 3, the entity named "Eugenia", represented by reference sign 320, has been dragged out of the circular presentation 310 of the top eight contacts 300. As exemplary use case, the user may use the selected contact entity 320 to get access to the detailed contact information of the contact entity 320 or to use the contact entity 320 to make a telephone call, to write an email or to send a short message to the person associated with the entity 320. In general terms, a certain function or action may be applied to or associated with a selected contact entity 320. Other examples of such functions may comprise the playing of a selected music file, the display of a selected picture or movie, the deletion of modification of the data associated with the entity, etc.

Figure 4:
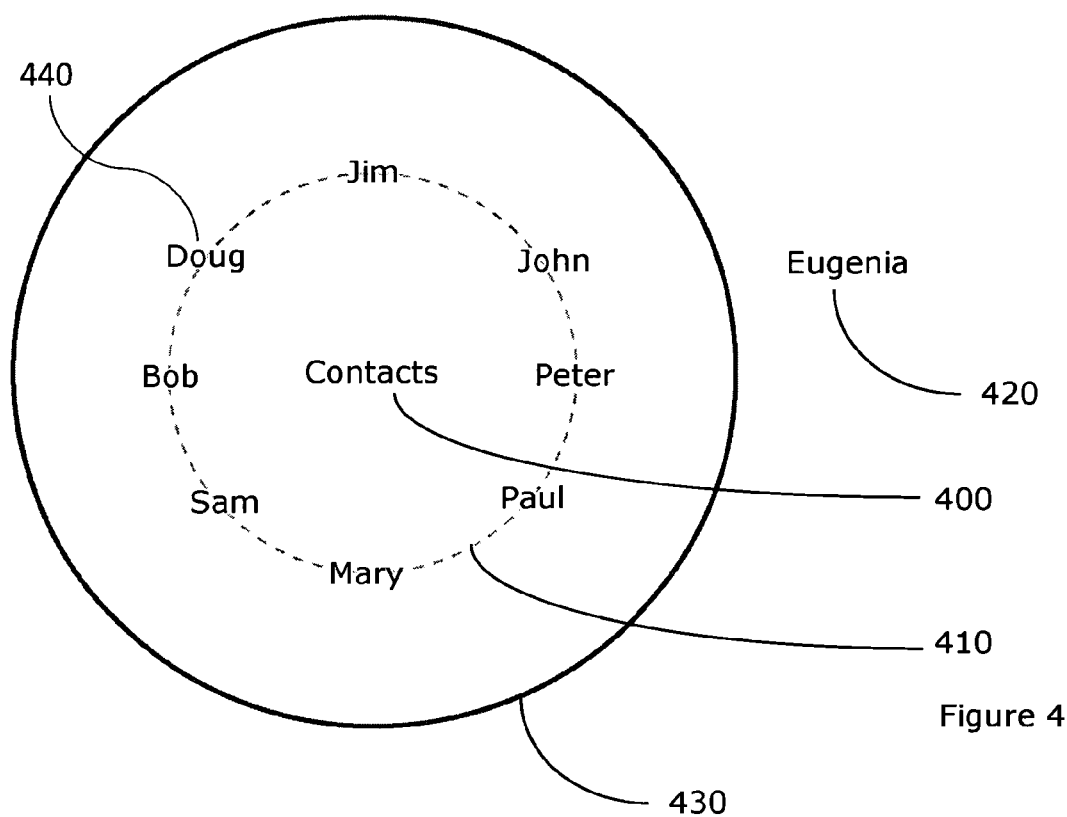
FIG. 4 illustrates the impact of an influencing information entity at a distance greater than a pre-defined threshold value.

Reference is now made to FIG. 4. According to an aspect, the distance between the selected entity 420 that was dragged out of the circular representation 410 of the displayed informational entities and the activated informational entity 400 plays a role for the retrieval of further informational entities. By way of example, there may be a threshold distance that triggers the influence of the distance. In such cases, an interaction between the dragged entity 420, which is also referred to as the influencing entity, and the activated entity 400 may only occur, when the distance between both of them is short enough. Such a threshold may be presented to the user as a circle 430 on the display that is visible while an informational entity 420 is dragged from the circle 410.

In general terms, an indication of the threshold area surrounding an activated entity may be visible when moving an influencing entity within the vicinity of the borders of the threshold area or within the vicinity of the complete threshold area.

In the example illustrated in FIG. 4, the dragged out entity 420 is outside the circle 430 and thus above the pre-defined threshold. Therefore, the dragged out entity 420 does not influence the set of informational entities associated with the contacts indicia 400 which are presented to the user. In such cases, the empty space on the circular representation 410 which was left behind by the dragged out entity 420 could simply be filled with one additional entity from the complete ordered list of contact entities. This may be done by retaining the previous order, i.e. the order of the frequency of use of the contact entities, so that the newly represented informational entity 440 would be displayed on the position of the least frequent entity, i.e. on the eleven o'clock position.

Figure 5:
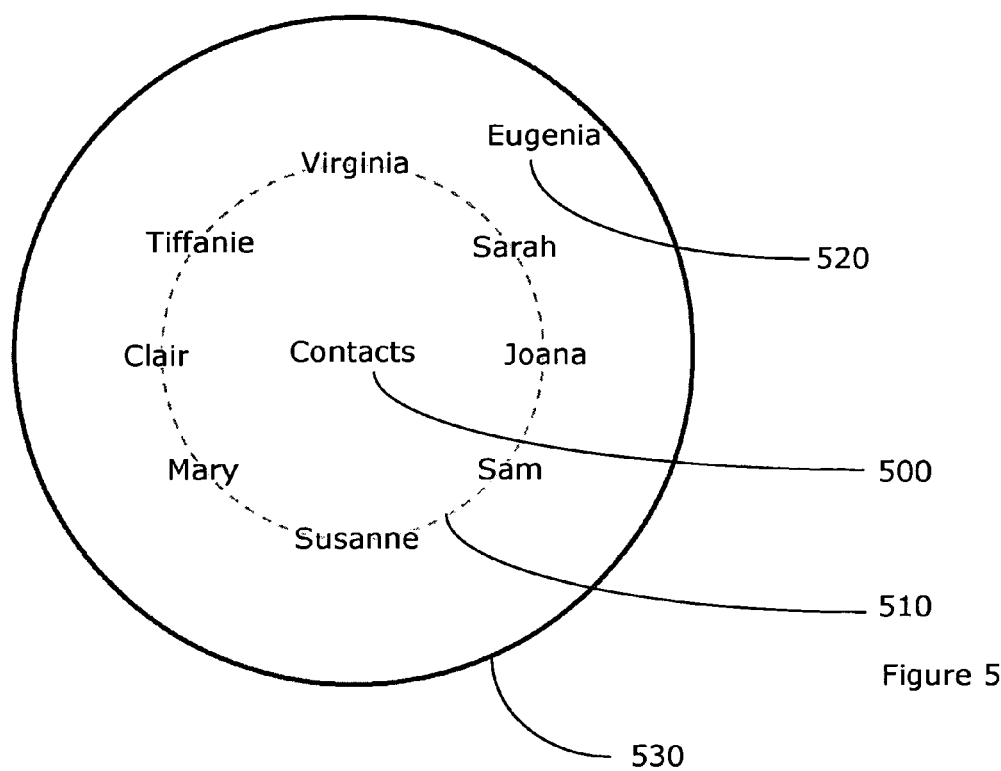
FIG. 5 illustrates the impact of an influencing information entity at a distance smaller than a pre-defined threshold value.

On the other hand, FIG. 5 illustrates an example, where the dragged out entity 520 is positioned within the threshold circle 530. This event may trigger the interaction between the activated entity 500 and the dragged entity 520. If the user activates the entity 500, then associated entities of the dragged out entity 520 may influence the set of informational entities and their ordering displayed in relation with contact indicia 500. By way of example, the modified set of informational entities 510 displayed on the screen may be an ordered list of contacts that are known to "Eugenia", i.e. to the entity 520. If a different entity 520 had been dragged out and placed within the circle 530 then the list 510 would possibly look different.

It should also be noted that more than one entity 520 may be dragged out of the set of informational entities 510 and positioned within the circle 530. In such cases, all these entities may influence the set of entities and their ranking displayed in the ordered list 510.

Furthermore, the threshold may be replaced or complemented by a distance dependent influence of dragged out entity or entities 520 on the list 510 of the activated entity 500. In such cases, entities that are farther away from the activated entity 500 would have less influence on the displayed list 510 than entities that are nearby the entity 500.

In addition, the method described in the present document could be applicable to all informational entities available within the system on which the described user interface is running. Such systems may be computer systems or mobile devices or PDAs. In such cases, the activation of a dragged out entity 520 could reveal a list of associated entities 510 from which the user could choose an appropriate entity. By way of example, this could be a set of emails associated with the entity "Eugenia", such as emails sent to her and received from her, pictures, the address, text documents related to the entity "Eugenia" and so on. In other words, it may be possible to toggle between different activated entities, i.e. while in a first instance the entity 500 may be activated and influenced by the influencing entity 520, it may be possible to activate entity 520, e.g. by pressing or clicking on it, and thereby degrade entity 500 to an influencing entity.

Furthermore, it is notable that there may be means for the user to select and drag other informational entities than the top N informational entities. In an embodiment, there may be a letter ring that pops up when the user has clicked on the informational entity 500 but has not selected one of the displayed entities 510 for a certain pre-defined amount of time. After such a time out a second ring could appear that allows the user to constrain the list of displayed entities 510 to entities whose associated name begins with a particular letter. The user could then select the desired entity or enter further letters to constrain the list further.

According to another aspect, the present invention revolves around the ordering of informational entities. These informational entities may be menu items, folder structures, entries in an address book, words, images, files and others.

Such an informational entity may have at least two properties, i.e. a name and an ordered list of associated entities, and according to one aspect, the present invention describes the relationship between such entities. The ordering of the associated entities may be based on their frequency of use. In this context, the term "use" could signify different sorts of activities such as the selection of this item or entity by the user during a selection process as e.g. the selection of a menu item. The term "use" could also comprise the processing of this entity, as for example the playing of a music file or the viewing of a picture. Every such utilization event may be registered in order to determine a cumulated value of the overall usage of an entity. This value or frequency may be stored together with the associated entities and may be updated based on the usage of the entity.

Figure 1:

As may be seen in FIGS. 1 and 2, a user instructs a computing device to view the list of associated entities 210 of an entity 200. The action of making the computer present a list of associated entities for one entity may also be referred to as the "activation" of that entity, i.e. in FIGS. 1 and 2 the user "activates" the entity 100, 200. In a preferred embodiment, the presentation of the associated entities is done in a way that the ordering may become apparent to the user. Such ordered presentation could be done by showing the entities names in different sizes or by providing a physical arrangement along a line or within a circle that implies some culture based ordering such as a "clockwise" ordering. Such "clockwise" ordering within a circle is shown in FIG. 2. Overall it can be stated that the ordering of the associated entities may be reflected by their physical presentation. As an example for such an ordered presentation, a contact list in a phone may be listed based on the frequency of use of the contacts rather than based on the alphabetic order of the contact names.

According to another aspect, the interaction between the associated lists of two informational entities is taken into account. This is illustrated in FIG. 5, where the interaction between the two informational entities 500 and 520 influences the displayed list of entities 510. According to this aspect, the ordering of a presented list may change if there is a second informational entity nearby. For example, the informational entities 500 and 520 may be presented on a computer screen and the physical or geometrical distance between these two entities, i.e. the physical distance between the indicia representing these two entities, may influence the presentation of the ordered list 510 of one of these entities. The distance may be measured as the distance on the screen between the coordinates of the indicia representing the two entities. Alternatively, the distance between two indicia may be defined by the number of pixels between them.

One form of interaction between two informational entities X and Y, e.g. reference signs 500 and 520 in FIG. 5, may be that the cut-set of their two associated lists is generated. By way of example, entity X may have a list of associated entities A, B and C, whereas entity Y has a list of associated entities B, C and D. When both entities X and Y are displayed on the screen and one of the entities is activated by the user then the device would show only the associated items B and C, as only these items are in the cut-set of the entities X and Y. It should be noted that depending on the embodiment such interaction between the entities X and Y may only occur, if the distance between both entities is below a pre-defined threshold level, as e.g. defined by the circle 530 in FIG. 5. Furthermore, it should be noted that other forms of interaction may be considered, such as the generation of a union-set of the associated entities.

Moreover, one could compute the frequencies (or more generally speaking: the scores) of the entities that occur in both lists of associations, i.e. in both lists associated to the entities X and Y. Such a computation could be the addition or multiplication of the frequencies or any other, more complex computation using the frequencies. For the above example the following frequencies f could be available for the associated entities. For the entity X, the associated items may have the following frequency values:
A: $f=1$, B: $f=2$, C: $f=4$.

In a similar fashion, the associated items of entity Y may have the following frequency values:
B: $f=3$, C: $f=10$, D: $f=6$.

It should be noted that even though the associated lists of X and Y partially comprise the same items, such as B and C, the frequencies of those items may be different, depending on which entity X or Y they are associated with. In other words, the frequencies of the associated items represent the usage of the item in conjunction with entity X or Y, respectively. Alternatively or in addition, absolute usage frequencies may be considered, i.e. frequencies of usage that are not measured in relation to another entities X or Y.

For the example above, the resulting ordered list of presented entities in the cut-set case would be
C: $s=14$, B: $s=5$,
wherein the variable represents the result of the frequency calculation. In a union-set case, the resulting list would be
C: $S=14$, D: $s=6$, B: $s=5$, A: $s=1$.

In the present example, the joint frequencies are determined by adding up the frequencies of identical entities in each set. It should be noted that other frequency calculation methods may be used.

Furthermore, according to another aspect, the distance between the entities X and Y may be taken into account as a weight for the computation of the joint set of associated entities. Among other things, the distance may influence the ordering of the associated entities. This ordering and the overall associated list may also be dependent on which one of the two entities X and Y is activated.

In general terms, it may be preferable that more distant entities have less influence on the ordering of a joint associated entity list than entities that are close to the activated entity. Consequently, there should be a computation taking into account the raw distance between the entities X and Y. One example could be the inverse value of the distance d, i.e. $1/d$. If it is assumed that the distance between X and Y is 2, then the distance dependent weight $1/d$ would be $½=0.5$. One way of computing the ordering based on the frequency while taking into account the distance would be to weight the frequency of the other entity, i.e. the non-activated entity or the influencing entity. In FIG. 5 the non-activated entity is illustrated by the reference sign 520.

As may be shown in an example, such approach produces different lists of associated items depending on which entity is activated by the user. If it is assumed that the user has activated X, then the results for the union-set case would be the following:
A: $s=1+0*0.5=1$, B: $s=2+3*0.5=3.5$, C: $s=4+10*0.5=9$, D: $s=0+6*0.5=3$.

In this example, it is assumed that entities which are not present in the associated list of an entity X or Y have a frequency of zero. Consequently, if X is activated and Y is placed in a distance of $d=2$, then the joint list of associated entities would have the following order:
C: $s=9$, B: $s=3.5$, D: $s=3$, A: $s=1$.

If, on the other hand, Y has been activated and X is placed in a distance of $d=2$, then the following result is obtained:
A: $s=0+1*0.5=0.5$, B: $s=3+2*0.5=4$, C: $s=10+4*0.5=12$, D: $s=6+0*0.5=6$,
and the order of the joint list of associated entities is:
C: $s=12$, D: $s=6$, B: $s=4$, A: $s=0.5$.

This example shows that an entity which is placed nearby an activated entity may influence the list of associated entities displayed in conjunction with the activated entity. In particular, the influencing entity may change the order of the list of associated informational entities. It has also been shown that the influence of the influencing entity may dependent on its distance to the activated entity.

It should be noted that the described algorithm may be extended to more than two entities. In particular, the list of associated entities of an activated entity may be influenced by a plurality of influencing entities. In such cases, the distances between the other entities and the activated entity may vary and by consequence the influence of the different other entities may also vary depending on their respective distance to the activated entity.

It is also noteworthy that the influence of the distance of an influencing entity to an activated entity may not only be linear in nature but could take different forms such as the square of the distance. In one example, the influence of an influencing entity may decrease proportional to one over its square distance to the activated entity. Furthermore, the distance dependent influence may be subject to a threshold. By way of example, there may be a defined distance between an influencing entity and an activated entity below which the influence of the distance could be proportional to the distance and above which the influence may be zero. Alternatively, the influence below the threshold may be fixed, e.g. at a value of 1.0, regardless of the distance. The use of a threshold above which an influencing entity has no more influence on the list of associated entities of an activated entity would allow for multiple activated entities to be displayed on the screen, which would not interact with one another if they have a long enough distance between them.

Figure 6:
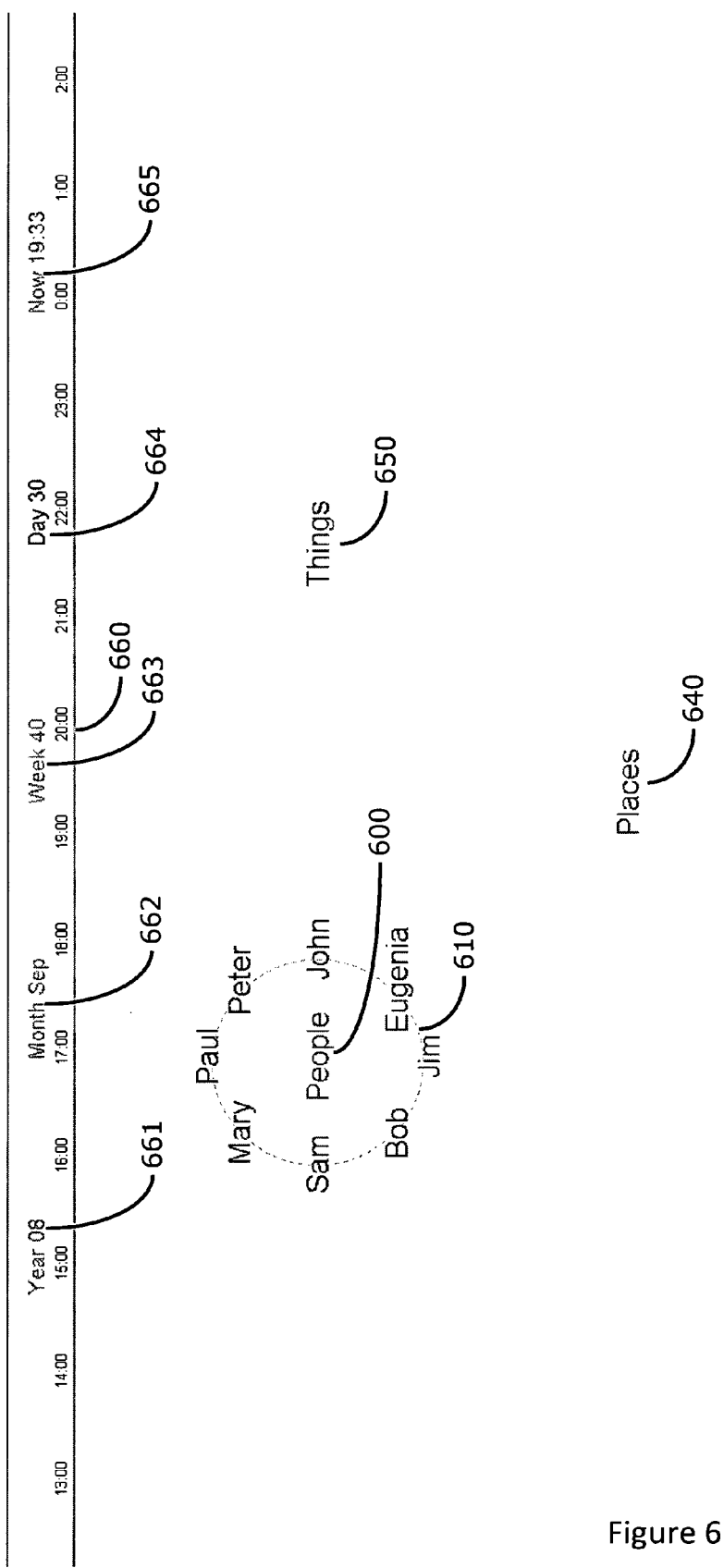
FIG. 6 illustrates an example of a user interface using the methods described in this document.

Reference is now made to FIG. 6, which illustrates a more fully featured scenario of the different aspects. By way of example, the invention could be used to implement a consumer computer with a touch screen that allows for the use and organization of various types of information, such as music, pictures, videos, email, contacts, appointments and websites. All this data can be organized and represented by the present invention in a synergetic way while departing from conventional concepts such as windows, files, folder hierarchies and applications. For a consumer computer, it is typically desirable to give a user direct access to the data he/she is keeping. At the same time, it is also desirable to keep the user interface as simple as possible. As already mentioned, one drawback of conventional computer user interfaces is that there are different applications for different types of data, e.g. a music player for music files, a picture viewer for pictures, an email application for emails, a browser for websites and so on. All of these applications have specific interfaces and menus that the user has to learn and get accustomed to At the same time, the computer does not help the user to fully exploit the power of the data that is stored in it. For example, it is not simple to find out who the friends or preferred contacts of a specific contact are, or who else lives in a particular city, or how that city looks like or when the user of the computer has visited that city last. In other words, the synergies between the applications and their local data cannot be leveraged in a satisfactory manner when using prior art user interfaces.

It should be noted that the method described in the present application is particularly well suited for man-machine or user interfaces that do not require a keyboard. By way of example, the methods could be implemented as a user interface of a tablet PC that could be operated entirely with a user's finger or with a pen. The user input would comprise the pointing at or the clicking on indicia representing entities on a screen and also the moving of those indicia. By bringing the indicia into the vicinity of one another, associations between the different related entities could be made which would enable a user to easily and intuitively retrieve a specific entity from the mass of data stored on the tablet PC. Upon the selection of the specific entity a desired set of functions, such as Writing of Emails, etc., may be performed.

In an exemplary embodiment, the present invention could be implemented to store user data in four gross categories, i.e. Time 660, People 600, Things 650 and Places 640. All of these categories, which are implemented as informational entities, may reveal their associated data at the touch of a finger or at the mouse-click of a user. In the illustrated example, the "Time" category 660 is represented at a time bar, on which time dependent events, such as meetings, arrivals of emails, music and so forth, would be arranged and displayed. It should be noted that this presentation is only one possible way of representation and that associated informational entities may be presented in various different ways. The synergies of such a unique presentation of a time bar, on which various time-dependent entities may be shown, arises from the fact that only one time line is available and required for the whole system. Preferably, there is no play-list for the music player, no calendar for the appointment application, no email list for the email application and so forth.

Not only can the user put events on the time line, the user can also drag dates from the time line to constrain the selection of data in the other categories. By doing so, a specific date of a certain interval of time may become an influencing entity for another activated entity. It should also be noted that the time line may be organized using different resolutions so that the user can switch between "days" 664, "weeks" 663, "months" 662, "years" 661 and so forth. Furthermore, by clicking the entity "now" 665, the user may be enabled to set the time ray to the current date and time.

FIG. 6 shows a further category "People" 600, which could comprise all information about the contacts that are known to the user. Such contacts may be organizations such as companies, hotels, restaurants and so forth, as well as people known to the device user. In other words, the entity "People" 600 could comprise a list of associated entities representing contact data. The illustrated user interface would allow a user to not only drag out one specific person from the list of associated entities and view the other people associated with this person, but it would also allow a user to drag out an entity representing a company name and view all the people working for this company as a list of associated entities. Furthermore, the user could drag an entity representing a person onto a specific time instance on the time bar 660, in order to obtain a list of associated entities having a relation with both the selected person and the selected time instance.

In addition, FIG. 6 shows a "Things" category 650, which could comprise all sorts of data that a user stores, such as emails, pictures and music. Similar to the other categories, also the "Things" category 650 is an informational entity that may have further associations, i.e. further associated entities, which appear on a screen, if selected by a user. By way of example, clicking on the entity "Things" 650 may trigger the display of a list of associated entities, such as emails, videos, music, pictures, websites. These associated entities may again each comprise a list of associated entities and so forth. At any time, the dragging of an influencing entity into the proximity of such an activated entity will influence the extent, the content and/or the representation of the list of associated entities.

Finally, FIG. 6 also shows a "Places" category 640, which could be associated with the information regarding the places that are known to the user, such as the contact's addresses, the cities that were visited by the user or that were cited in emails or even websites that the user has viewed. Using the methods described in the present document, the user could easily find out what people live in a particular city, by bringing an entity associated with the particular city into the vicinity of the activated "People" entity 600. The people having a certain relation to that particular city would then be displayed as a list of associated entities 610. As another example, the user could also use the entity related to the particular city to retrieve pictures from the "Things" category 650 which were taken in this city. This is particularly useful if the pictures were taken using a GPS (global positioning system) enabled camera and contain longitude and latitude information of the location that the picture where taken at.

It should be noted that all of these gross categories 600, 640, 650 and 660 could also have sub-categories associated with them so that emails could be organized in sub-categories and music files could be organized according to genres, artists and album titles.

In the following, exemplary use cases are described that reveal the synergetic benefits of the present invention:

In a first example, the user could drag out a person from the "People" category 600 and place it near the category "Places" 640. Activating the category "Places" 640 would reveal the address of that person.

In another example, the user generates a new event, i.e. a new entity, "Party" on Sunday, the 12th of October 2008, 20:00-24:00 o'clock on the time ray 660. He may invite a couple of people by dragging them from the "People" category 600 and associating them with that event. When the event actually occurs, the user may use the same device to play music on the party by dragging some albums from the "Things" category 650 to the time line where they will be played at that particular time. As a result of this association, the system will not only know which people were invited to the particular party and associate these people with one another. The system will also know that these people listened to the particular set of songs by associating the people with the music. Due to this information and the effected associations, the user could retrieve people in the future, who know each other, i.e. people that are associated with one another. Furthermore, he could also retrieve the music associated with those people.

In a further example, if the user uploads pictures from a GPS enabled camera, the system would know the places where pictures were taken simply by finding a location in the category "Places" 640. For this purpose, the entities associated with the category "Places" 640 should be provided with longitude and latitude information. By way of example, a consumer computer or a mobile device could be delivered with a list of cities or even streets and houses along with their longitude and latitude information akin to current navigation systems. The system could then show the pictures of a known person living at a particular place simply by moving the informational entity of that person to the "Things→Pictures" entity to reveal those pictures.

In a further example, the "Places" entity 640 could have an associated entity called "here", if the consumer computer or mobile device is equipped with a GPS receiver. This entity "here" could be used to identify people from the "People" entity 600 who live nearby the current location of the user. For this purpose, the entity "here" could be dragged into the vicinity of the activated "People" category 600. Alternatively, the entity "here" could be used to select pictures from the entity "Things" 650 which have been taken earlier in the area of the current location. Furthermore, the user could drag the year "1980" from the time line 660 to the activated entity "Pictures", while having the entity "here" nearby. The system would then show pictures of this particular place that were taken in or around 1980. The user could thus walk the streets of a city and see how they looked like thirty years ago.

In another example, the activated entity "Pictures" could be dragged to the time line 660 in order to reveal the pictures sorted by time. If, in addition, the entity associated with a particular person is dragged to the time line 660, then only those pictures associated to that person are shown. Such association between the pictures and a particular person could be established based on the home address of the person, e.g. by associating the GPS data of the pictures with the GPS data of that address. Such association could also be established due to the fact that the person was present at a scheduled meeting, travel or party, which was associated with the pictures.

In yet another example, dragging the activated entity "Things→Emails" to the time line 660 would show the Emails that were received and sent at the selected point in time. By dragging in addition an entity associated with a person to the time line, the list of Emails could be further restricted to the Emails that were sent to and received from that particular person.

In a further example, a user could identify the set of Emails that were exchanged with two particular people by dragging the two associated contact entities to the activated "Emails" entity. The two influencing contact entities would then restrict the set of associated entities displayed for the activated "Emails" entity.

These examples show that the present invention is applicable to a multitude of different data types such as pictures, Emails, contacts and music. A multitude of data can be associated manually or automatically and then retrieved using one single user interface. This interface is extremely simple and intuitive, yet very powerful and allows for "data mining" one's personal data. All these different data types are represented by informational entities. All informational entities can have associations. The retrieval of associated entities depends on the physical distance of other informational entities and influences the ranking of the associated entities.

The described methods may be implemented on computer systems, such as work stations, desktop PCs, laptops, tablet PCs, and handheld or wireless devices, such as mobile phones, smart phones, PDAs, etc. They could be used as user interfaces for the operating systems of such systems and devices and thereby facilitate the interaction between the user and the devices and allow for an intuitive, simple and fast retrieval of data from the memory of the device. As such, the described method is particularly useful for datamining. Furthermore, the method could be implemented as a joint and common user interface for a plurality of software applications, such as Email applications, Calendar applications, Address book applications, Playlist applications, Picture book Applications, etc.

The present invention is not limited to the disclosed exemplary scenarios. Other use cases can benefit from the invention as well. This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art.

The invention claimed is:

1. A user interface method executed on a processor for displaying, on a screen, indicia for a plurality of entities associated with at least one of at least two particular entities, comprising the steps of:

displaying, on the screen, a first indicia for a first particular entity;

displaying, on the screen in a circular arrangement around the first indicia, a plurality of indicia for a first set of entities associated with the first particular entity;

determining that a user has dragged one of the plurality of indicia for the first set of entities associated with the first particular entity to a different position on the screen;

displaying a threshold circle around the circular arrangement while the one of the plurality of indicia for the first set of entities is dragged out from the circular arrangement;

determining a distance on the screen between the one of the plurality of indicia for the first set of entities that is dragged out from the circular arrangement and the first indicia, wherein the distance is determined based on coordinates of the displayed indicia representing the first indicia and the one of the plurality of indicia that is dragged out;

when the determined distance is smaller than a predefined threshold distance corresponding to the threshold circle, determining a second set of entities, wherein the second set of entities is associated with the first particular entity, and displaying, on the screen in the circular arrangement around the first indicia, a plurality of indicia for the second set of entities instead of the indicia for the first set of entities; and when the determined distance is larger than the predefined threshold distance, updating the first set of entities by filling an emptied area in the first set of entities that was defined by dragging out the one of the plurality of indicia with another entity to define an updated first set of entities, and displaying, on the screen around the first indicia, the plurality of indicia for the updated first set of entities.

2. The method according to claim 1, comprising the further steps of:
   determining a representation of the plurality of entities based on the distance on the screen between the indicia of the at least two particular entities; and
   displaying indicia for the plurality of entities using the determined representation.

3. The method according to claim 2, wherein the plurality of entities is represented as one of or a combination of:
   ordered list; and
   clockwise circular list.

4. The method according to claim 1, wherein the distance between the two particular entities is proportional to their geometric distance.

5. The method according to claim 1, comprising the further steps of:
   selecting the first particular entity as an activated entity;
   selecting the second particular entity as an influencing entity;
   associating the first set of entities with the activated entity;
   associating the second set of entities with the influencing entity; and
   determining the plurality of entities to be displayed and/or a respective representation based on the first and the second set of entities.

6. The method according to claim 5, wherein
   a plurality of influencing entities is selected from the at least two particular entities;
   the second set of entities is associated with each of the plurality of influencing entities; and
   the determining step of the plurality of entities and/or its representation is based on the second set of entities.

7. The method according to claim 5, comprising the further steps of:
   selecting another one of the at least two particular entities as the activated entity; and
   automatically degrading the former activated entity to an influencing entity.

8. The method according to claim 1, comprising the further steps of:
   calculating scores for the set plurality of entities;
   ordering the set plurality of entities according to the calculated scores; and
   selecting a pre-defined number of entities of the set plurality of entities having the highest calculated scores to be displayed as the set plurality of entities.

9. The method according to claim 8, wherein
   entities of the first set of entities have associated first scores;
   entities of the second set of entities have associated second scores; and
   the set of entities to be displayed and/or a respective representation is determined based on the first and second scores of the first and second set of entities.

10. The method according to claim 9, comprising the further steps of:
    calculating scores of the set of entities based on the first and second scores of the first and second set of entities;
    ordering the set plurality of entities according to the calculated scores;
    selecting a pre-defined number of entities having the highest calculated scores to be displayed as the displayed set of entities.

11. The method according to claim 8, wherein the scores correspond to frequencies of selection of respective entities.

12. The method according to claim 1, wherein the plurality of entities are organized in categories and at least one category is selected from one of: people, time, places, and things.

13. The method according to claim 1, comprising the further steps of:
    setting a time limit;
    if the time limit has been exceeded and no entity of the displayed set of entities has been selected, displaying search means facilitating the search for a different set of entities.

14. A computing device for displaying indicia for a set of entities associated with at least one of at least two particular entities, comprising:
    a screen for displaying the indicia for the set of entities and indicia for the at least two particular entities; and
    a processor for controlling the screen to:
    display, a first indicia for a first particular entity of the at least two particular entities;
    display, in a circular arrangement around the first indicia, a plurality of indicia for a first set of entities associated with the first particular entity;
    determine that a user of the computing device has dragged one of the plurality of indicia for the first set of entities to a different position on the screen;
    display a threshold circle around the circular arrangement while the one of the plurality of indicia for the first set of entities is dragged out from the circular arrangement;
    determine a distance between the one of the plurality of indicia for the first set of entities that is dragged out from the circular arrangement and the first indicia, wherein the distance is determined based on coordinates of the displayed indicia representing the first indicia and the one of the plurality of indicia that is dragged out;
    when the determined distance is smaller than a pre-defined threshold distance corresponding to the threshold circle, determine a second set of entities; wherein the second set of entities is associated with the first particular entity, and
    display, on the screen in the circular arrangement around the first indicia, a plurality of indicia for the second set of entities instead of the indicia for the first set of entities; and
    when the determined distance is larger than the pre-defined threshold distance, update the first set of entities by filling an emptied area in the first set of entities that was defined by dragging out the one of the plurality of indicia with another entity to define an updated first set of entities, and displaying, on the screen around the first indicia, the plurality of indicia for the updated first set of entities.

15. The computing device of claim 14 comprising a storage unit for storing the entities and wherein an entity is at least one of contacts from a contact databank, places from a geographical databank, time instances from a calendar application, files from a file storage application, web sites from a web-browser application or emails from an Email application.

16. The computing device of claim 14 comprising an application module and wherein a function is applied on a selected entity by passing the entity to the application module.

\* \* \* \* \*

UNITED STATES PATENT AND TRADEMARK OFFICE
CERTIFICATE OF CORRECTION

PATENT NO. : 9,600,142 B2
APPLICATION NO. : 13/123153
DATED : March 21, 2017
INVENTOR(S) : Ramin O. Assadollahi It is certified that error appears in the above-identified patent and that said Letters Patent is hereby corrected as shown below:

In the Claims

Column 15, Line 49 (Claim 8) remove "set" between "the" and "plurality".

Column 15, Line 53 (Claim 8) remove "set" between "the" and "plurality".

Column 15, Line 66 (Claim 10) remove "set" between "the" and "plurality".

Signed and Sealed this
Twentieth Day of June, 2017

Joseph Matal
*Performing the Functions and Duties of the
Under Secretary of Commerce for Intellectual Property and
Director of the United States Patent and Trademark Office*